(12) United States Patent
Tamminen et al.

(10) Patent No.: US 9,298,192 B2
(45) Date of Patent: Mar. 29, 2016

(54) METHOD FOR TUNING A VENTILATION SYSTEM

(71) Applicant: ABB TECHNOLOGY OY, Helsinki (FI)

(72) Inventors: Jussi Tamminen, Lappeenranta (FI); Jero Ahola, Lappeenranta (FI); Tero Ahonen, Lappeenranta (FI); Simo Hammo, Lappeenranta (FI)

(73) Assignee: ABB TECHNOLOGY OY, Helsinki (FI)

( * ) Notice: Subject to any disclaimer, the term of this patent is extended or adjusted under 35 U.S.C. 154(b) by 263 days.

(21) Appl. No.: 13/887,113

(22) Filed: May 3, 2013

(65) Prior Publication Data

US 2013/0297079 A1 Nov. 7, 2013

(30) Foreign Application Priority Data

May 3, 2012 (EP) .................................... 12166510

(51) Int. Cl.
*G05D 7/06* (2006.01)
*F24F 11/00* (2006.01)
(Continued)

(52) U.S. Cl.
CPC ............ *G05D 7/0629* (2013.01); *F04D 27/004* (2013.01); *F24F 11/0001* (2013.01); *F24F 11/0079* (2013.01); *F24F 13/02* (2013.01); *Y02B 30/746* (2013.01)

(58) Field of Classification Search
CPC . G05D 7/0629; F04D 27/004; F24F 11/0001; F24F 11/0079; F24F 13/02; Y02B 30/746
USPC .................................................. 700/276–278
See application file for complete search history.

(56) References Cited

U.S. PATENT DOCUMENTS 5,019,757 A 5/1991 Beifus
5,579,993 A * 12/1996 Ahmed et al. ............... 236/49.3
(Continued)

FOREIGN PATENT DOCUMENTS

CN 1773124 A 5/2006
EP 1 039 139 A1 9/2000
EP 1 921 392 A2 5/2008

OTHER PUBLICATIONS

European Search Report for EP 12166510 dated Jun. 29, 2012.
(Continued)

*Primary Examiner* — Mohammad Ali
*Assistant Examiner* — Nathan L Laughlin
(74) *Attorney, Agent, or Firm* — Buchanan Ingersoll & Rooney PC (57) ABSTRACT

A method includes selecting the branch of a ventilation system with the greatest pressure loss, opening a control valve in the selected branch and closing control valves in all other branches, controlling a fan to produce the desired air flow rate into the selected branch by using fan characteristic shaft power to air flow rate curves, and a shaft power estimate from the frequency converter and by adjusting the rotational speed of an electric motor to achieve the desired air flow rate, calculating the fan pressure corresponding to the desired air flow rate from fan characteristic fan pressure to air flow rate curves, saving the calculated fan pressure as a reference pressure, and adjusting the control valves in each of the remaining branches so that the desired air flow rate to each branch is delivered while the fan is controlled by the frequency converter to produce the reference pressure.

5 Claims, 6 Drawing Sheets

(51) Int. Cl.
*F04D 27/00* (2006.01)
*F24F 13/02* (2006.01)

(56) References Cited

U.S. PATENT DOCUMENTS

| | | | | |
|---|---|---|---|---|
| 5,705,734 | A * | 1/1998 | Ahmed | 73/1.35 |
| 6,462,494 | B1 | 10/2002 | Schöne et al. | |
| 2003/0064676 | A1 * | 4/2003 | Federspiel | 454/75 |
| 2006/0099084 | A1 | 5/2006 | Otaki et al. | |
| 2008/0119126 | A1 | 5/2008 | Shizuo et al. | |
| 2010/0256820 | A1 | 10/2010 | Jeung et al. | |

OTHER PUBLICATIONS

Office Action (Notification of the First Office Action) issued on Apr. 17, 2015, by the State Intellectual Property Office of People's Republic of China in corresponding Chinese Patent Application No. 201310152850.9, and an English Translation of the Office Action. (11 pages).

* cited by examiner

METHOD FOR TUNING A VENTILATION SYSTEM

RELATED APPLICATION

This application claims priority under 35 U.S.C. §119 to European Patent Application No. 12166510.3 filed in Europe on May 3, 2012, the entire content of which is hereby incorporated by reference in its entirety.

FIELD

The present disclosure relates to a method for tuning a ventilation system.

BACKGROUND INFORMATION

Ventilation systems are present in almost every building. Ventilation systems are used to ensure a continuous supply of fresh air to the building. The energy required by the air transfer is dominated by the volume of air to be transferred and the pressure losses generated by the transferred air. Thus, if ventilation systems are to be made more efficient, the pressure losses should be minimized.

The pressure losses are mainly generated by the system filter, the duct bends, the piping and the control valves at each room. It can roughly be said that the filter pressure losses and the control valve pressure losses are much more significant than the duct pressure losses. The ducts are designed so that the pressure loss is less than 1 Pa/m in order to reduce the noise caused by air passing in the ducts. The pressure losses of a control valve are usually in the order of 1 to 100 Pa, and the filter pressure losses are normally in the order of 150 Pa. The control valve pressure losses are adjustable and should thus be minimized to ensure energy efficient operation of the ventilation system.

The tuning of the ventilation system is carried out after the installation of the ventilation system. The tuning phase is extremely important, and careless tuning can easily undo an energy efficient designed and dimensioned ventilation system. The proper ventilation tuning according to known methods is an iterative and time consuming process. In addition, the accurate measurement of pressures and air flow rates is difficult with hand held equipment in field conditions. In known tuning methods, the valve in the furthermost branch is opened and the valves in the other branches are closed. The air flow rate in the furthermost branch is then set to a desired level by adjusting the rotation speed of the fan driven by the frequency converter controlled electric motor to an appropriate level. The rotation speed of the fan is then kept at this level, and the valves in the other branches are adjusted so that a desired air flow rate is achieved into each branch. When each branch has been set, the flow rate of the furthermost branch must be adjusted once again by adjusting the rotation speed of the fan. The rotation speed of the fan is then kept at this level, and the valves in the other branches are once again adjusted so that a desired air flow rate is achieved into each branch. The need of the further iteration rounds is due to the fact that when the flow rate to the other branches are increased, the pressure produced by the fan drops, which means that the flow rate to the branch first tuned also drops.

SUMMARY

An exemplary embodiment of the present disclosure provides a method for tuning a ventilation system. The ventilation system includes a ventilation fan supplying air to a plurality of branches. Each branch includes a corresponding control valve for regulating the air flow to that branch. The ventilation fan is driven by a frequency converter controlled electric motor. The exemplary method includes selecting the branch in the ventilation system with the greatest pressure loss, and opening the control valve in the selected branch and closing the control valves in all other branches. In addition, the exemplary method includes controlling the ventilation fan to produce a desired air flow rate into the selected branch by using fan characteristic shaft power to air flow rate curves and a shaft power estimate from the frequency converter, and by adjusting the rotational speed of the electric motor with the frequency converter so that the desired air flow rate is achieved. The exemplary method also includes calculating, in the frequency converter, simultaneously the fan pressure corresponding to the desired air flow rate from fan characteristic fan pressure to air flow rate curves based on the desired air flow rate and the rotational speed of the electric motor, and saving the calculated fan pressure in the frequency converter as a reference pressure. Further, the exemplary method includes adjusting the control valves in each of the remaining branches one-by-one so that the desired air flow rate to each branch is delivered while the fan is controlled by the frequency converter to produce constantly the reference pressure.

An exemplary embodiment of the present disclosure provides a non-transitory computer-readable recording medium having recorded thereon a computer program that causes a processor of a frequency converter to execute operations for tuning a ventilation system. The ventilation system includes a ventilation fan supplying air to a plurality of branches. Each branch includes a corresponding control valve for regulating the air flow to that branch. The ventilation fan is driven by an electric motor controlled by the frequency converter. The program causes the processor of the frequency converter to carry out operations including: selecting the branch in the ventilation system with the greatest pressure loss; opening the control valve in the selected branch and closing the control valves in all other branches; controlling the ventilation fan to produce a desired air flow rate into the selected branch by using fan characteristic shaft power to air flow rate curves and a shaft power estimate from the frequency converter, and by adjusting the rotational speed of the electric motor with the frequency converter so that the desired air flow rate is achieved; calculating simultaneously the fan pressure corresponding to the desired air flow rate from fan characteristic fan pressure to air flow rate curves based on the desired air flow rate and the rotational speed of the electric motor, and saving the calculated fan pressure in the frequency converter as a reference pressure; and adjusting the control valves in each of the remaining branches one-by-one so that the desired air flow rate to each branch is delivered while the fan is controlled by the frequency converter to produce constantly the reference pressure.

BRIEF DESCRIPTION OF THE DRAWINGS

Additional refinements, advantages and features of the present disclosure are described in more detail below with reference to exemplary embodiments illustrated in the drawings.

DETAILED DESCRIPTION

Exemplary embodiments of the present disclosure provide a fast and reliable method for tuning a ventilation system.

In accordance with an exemplary embodiment, the ventilation system to be tuned includes a ventilation fan supplying air to a plurality of branches. Each branch includes a control valve for regulating the air flow to the corresponding branch. The ventilation fan is driven by a frequency converter controlled electric motor.

In accordance with an exemplary embodiment, a method for tuning the ventilation system includes selecting the branch with the greatest pressure loss, and opening the control valve in the selected branch and closing the control valves in all other branches. The exemplary method also includes controlling the ventilation fan to produce a desired air flow rate into the selected branch by using fan characteristic shaft power to air flow rate curves, and a shaft power estimate from the frequency converter, and by adjusting the rotational speed of the electric motor with the frequency converter so that the desired air flow rate is achieved. In addition, the exemplary method includes calculating simultaneously the fan pressure corresponding to the desired air flow rate from fan characteristic fan pressure to air flow rate curves based on the desired air flow rate and the rotational speed of the electric motor, and saving (e.g., in a non-transitory computer-readable recording medium such as a ROM, hard disk drive, flash memory, etc. of the frequency converter) the calculated fan pressure in the frequency converter as a reference pressure for the next step. The exemplary method also includes adjusting the control valves in each of the remaining branches one-by-one so that the desired air flow rate to each branch is delivered while the fan is controlled by the frequency converter to produce constantly the reference pressure.

An estimate of the specific fan power of the ventilation system at the nominal operation point as a ratio of the electrical power consumed by the frequency converter and the total air flow rate calculated in the frequency converter can further be calculated.

The tuning method according to the present disclosure makes it possible to minimize the electric energy consumption of the ventilation system. This is done by minimizing the pressure losses of the ventilation system. The tuning method according to the present disclosure can be carried out without iteration. This is accomplished by using model-based estimation methods such as fan characteristic curves to calculate the fan flow rate and the fan pressure. The tuning method according to the present disclosure does not require any additional measurement equipment. The tuning method according to the present disclosure results in optimal system energy efficiency, and gives an estimate of the ventilation system efficiency, such as a specific fan power (SFP), for example. The specific fan power can then be used to verify the design and tuning of the ventilation system.

The installation procedure of the ventilation system ends with the tuning phase. In the tuning phase, the valves of the air ducts in the ventilation system are adjusted so that:

1) The desired air flow rate is delivered to each room and from each room.

2) The desired static pressure exists in the air ducts, which guarantees the proper operation of the air valves.

3) The minimum amount of energy is used to deliver the desired air flow (optimization of specific fan power (SFP)).

In accordance with an exemplary embodiment, the method can be implemented by one or more processors of a computer-processing device executing computer-readable instructions tangibly recorded on a non-transitory computer-readable recording medium (e.g., a ROM, hard disk drive, flash memory, etc.) for controlling the electric motor driving the fan. The method makes it possible to straightforwardly tune the ventilation system in such a way that the conditions presented in points 1), 2) and 3) are met. The tuning can be carried out without any extra measurement instrumentation. The method is based on the utilization of the control abilities of the frequency converter controlling the electric motor and as such known fan flow rate and fan pressure estimation methods.

Figure 1:
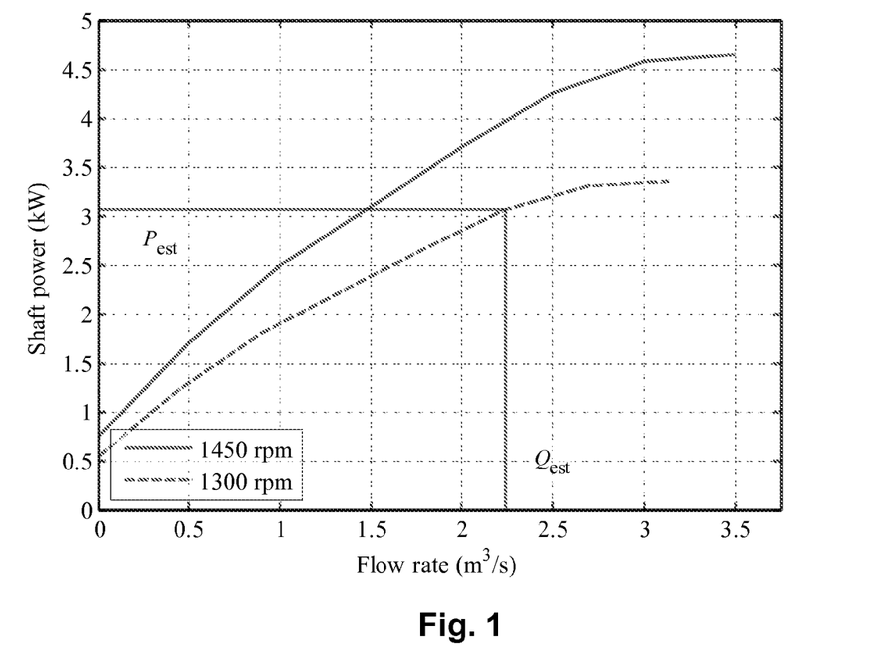
FIG. 1 shows a fan specific shaft power to air flow rate diagram.
Figure 2:
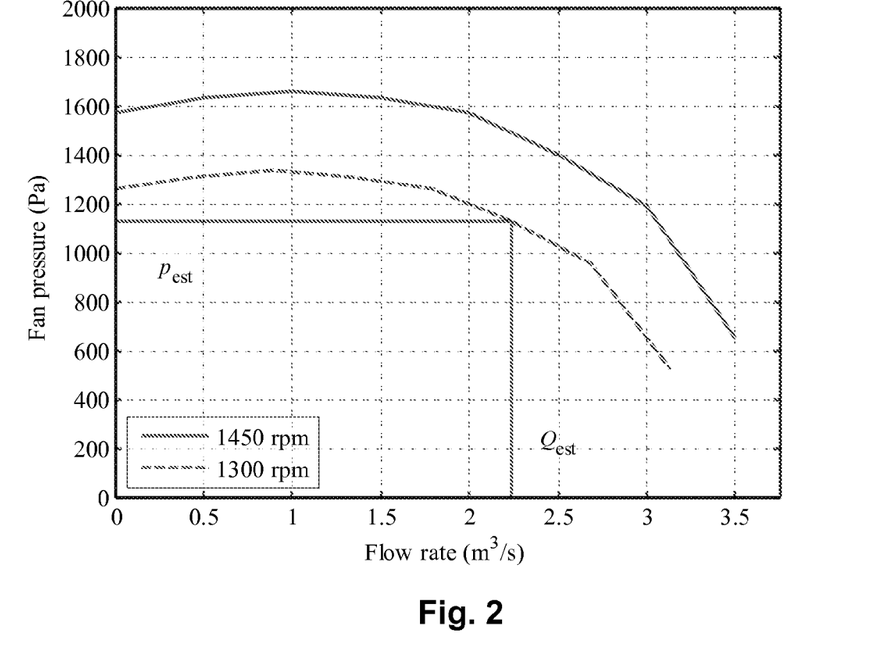
FIG. 2 shows a fan specific fan pressure to air flow rate diagram.

FIG. 1 shows a fan specific shaft power to air flow rate diagram, and FIG. 2 shows a fan specific fan pressure to air flow rate diagram.

The model-based fan air flow rate and pressure estimation uses the fan characteristic curves as a model and the rotational speed and power estimates of the frequency converter controlling the electric motor as input values to the model. First, the fan characteristic curves are converted into the instantaneous rotational speed. This conversion of the air flow rate Q, the pressure p and the shaft power P can be carried out by the affinity laws:

$$Q = \frac{n}{n_0} Q_0 \quad (1)$$

$$p = \left(\frac{n}{n_0}\right)^2 p_0 \quad (2)$$

$$P = \left(\frac{n}{n_0}\right)^3 P_0 \quad (3)$$

where n is the current rotational speed, and the subscript 0 denotes the values of the characteristic curves.

Then, the estimated air flow rate $Q_{est}$ corresponding to the estimated shaft power $P_{est}$ is found on the rotational speed corrected fan shaft power to air flow rate diagram. The produced fan pressure $p_{est}$ is estimated using the estimated air flow rate $Q_{est}$ and the rotational speed corrected fan pressure to air flow rate diagram.

FIG. 1 shows that the fan has to be operated at a rotational speed of 1300 rpm in order to achieve an air flow rate of 2.25 m³/s which leads to a shaft power of 3.05 kW. FIG. 2 shows that an air flow rate of 2.25 m³/s and a rotational speed of 1300 rpm results in a fan pressure of 1150 Pa.

It is known that the hydraulic power at the fan output can be calculated with:

$$P_{Hydraulic} = Q \Delta p_{tot} \quad (4)$$

where Q is the volumetric air flow rate and $\Delta p_{tot}$ is the total pressure difference.

The volumetric air flow rate is calculated (e.g., by one or more processors or a programmable logic device (PLD), such as an FPGA of the frequency converter) for each space that has to be ventilated, and the ventilation fan is responsible for the delivery of this air flow rate. Thus, the air flow rate is a fixed ventilation process related constant. Moreover, the total pressure differential is the only variable that can be influenced. The total pressure differential should thus be minimized in order to reach an energy efficiency optimum. The smallest pressure that satisfies the need of all spaces needing ventilation is the pressure that is needed in the branch with the greatest pressure loss $p_{Loss,Branch}$. The pressure loss for a branch can be calculated with:

$$p_{Loss,Branch} = k_{Branch} Q_{Branch}^2 \quad (5)$$

where $k_{Branch}$ is the dynamic resistance of the branch, and $Q_{Branch}$ is the desired volumetric air flow rate through the branch.

If the pressure is lower than this, there will not be sufficient pressure to achieve the desired air flow rate to this branch. If the pressure is greater, then the control valve of this branch has to be adjusted to add flow resistance to the system. This excess pressure increases energy losses in this branch as well as in all the other branches resulting in non-optimal energy efficiency in the ventilation system. Hence, to achieve the optimum energy efficiency, the branch with the greatest pressure loss should be selected as the starting point for the optimization procedure. This principle is generally known and utilized in the tuning of ventilation systems.

The frequency converter based method according to the present disclosure makes it possible to tune the ventilation system straightforwardly in such a way that the correct air flow rates are delivered to each space with a minimum electric energy consumption. The tuning is completely based on control and estimation abilities of the frequency converter. Thus, no extra measurement instrumentation is necessarily required. It is also possible in the method to calculate the specific energy consumption of the ventilation system after the tuning procedure is completed. The specific energy consumption (kWh/m³) is a generally used measure of the performance of the ventilation system. Some countries have regulations stipulating maximum specific energy consumptions for buildings.

Step 1:

In the first step of the method, the duct branch which is expected to have the greatest pressure loss, excluding the control valves, is selected. The pressure loss of a branch $p_{Loss,Branch}$ can be calculated with equation (5). The control valve of the branch is set open, and the control valves of all the other branches in the ventilation system are closed. The ventilation fan is controlled by the frequency converter to produce the correct flow rate to this branch based on the model of the fan, whereas the frequency converter simultaneously calculates the corresponding fan pressure estimate. Next, the fan pressure estimated by the frequency converter is saved as a reference pressure $p_{reference}$ for the second step.

Figure 3:
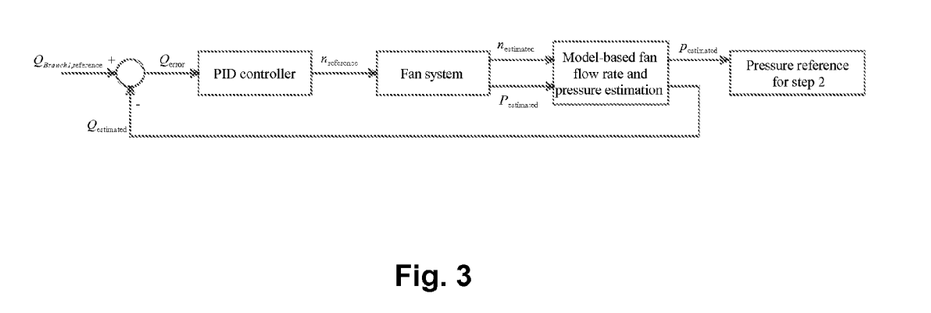
FIG. 3 shows a control loop for achieving the first step in a method according to an exemplary embodiment of the present disclosure.

FIG. 3 shows a control loop that can realize step 1 according to an exemplary embodiment of the present disclosure. The fan rotational speed reference $n_{reference}$ is controlled with a PID controller. The frequency converter controls the actual rotational speed of the fan according to the speed reference and produces estimates on the rotational speed $n_{estimate}$ and the shaft power $P_{estimate}$. The model-based air flow rate and pressure estimation method is used to estimate the flow rate $Q_{estimate}$ and the pressure $p_{estimate}$. The estimated flow rate is used in the calculation of the flow rate error $Q_{error}$ fed to the PID controller along with the flow rate reference $Q_{Branch1,reference}$ of the branch with the highest pressure loss. The pressure estimate is saved as the pressure reference $p_{reference}$ for step 2 when the reference flow rate is reached.

Step 2:

In the second step of the tuning, all the other branches in the ventilation system are adjusted to produce the correct flow rates. For this purpose, the fan is controlled to produce a constant pressure reference $p_{reference}$ acquired in the first step. The frequency converter uses model based operation point estimation to adjust the rotation speed of the fan in such a way that the pressure reference $p_{reference}$ is maintained all the time. Each branch in the ventilation system is then adjusted one-by-one with the control valve of the corresponding branch to produce the correct air flow rate. For this purpose, the frequency converter gives the total flow rate estimate and/or an additional flow rate estimate. The control valve is adjusted until the air flow rate estimate corresponds to the desired value for each branch in the ventilation system.

Figure 4:
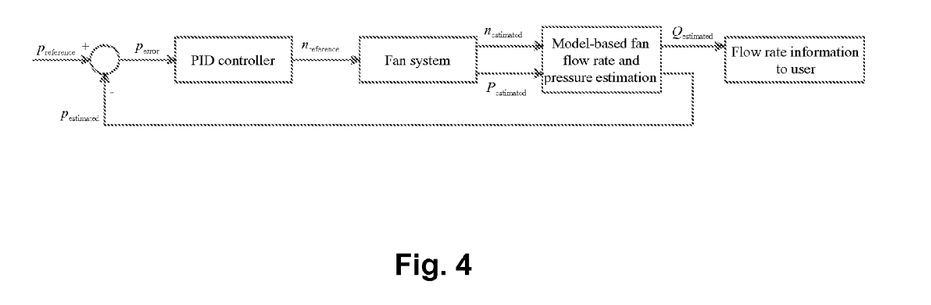
FIG. 4 shows a block diagram to control a fan with a constant pressure using model-based estimation methods according to an exemplary embodiment of the present disclosure.

FIG. 4 shows a block diagram to control a ventilation system with a constant pressure using model-based estimation methods, according to an exemplary embodiment of the present disclosure. The fan can be controlled to maintain a constant pressure using the model-based estimation method. The pressure error variable $p_{error}$ is fed to a PID controller. The PID controller calculates a new rotational speed reference $n_{reference}$ to the fan. The frequency converter controlling the electric drive motor of the fan controls the actual system according to the rotational speed reference and estimates the motor rotational speed $n_{estimate}$ and shaft power $P_{estimate}$. The estimates are then used for the model-based estimation of the fan pressure $p_{estimate}$. The air flow rate information is constantly updated to the user, so the user can adjust the flow rate with the control valve to a desired setting.

Step 3:

When the flow rates of all branches in the ventilation system are tuned to the desired one, the frequency converter calculates (e.g., by one or more processors or a programmable logic device (PLD), such as an FPGA of the frequency converter) the estimate for the specific fan power (SFP) of the ventilation system at the nominal operating point with:

$$SFP = \frac{P_{in}}{Q_{est}} \quad (6)$$

where $P_{in}$ denotes the electrical power consumed by the frequency converter and $Q_{est}$ is the total air flow rate estimated by the frequency converter.

After this, the frequency converter can be set to control the total flow rate based on the model based estimation. This approach makes it possible to implement easily different modes to the ventilation system, for example, for the time periods when there are no persons in the building. In addition to the flow rate control, the reduced flow rate due to dirt accumulation on the filters can be compensated. This can be accomplished with the block diagram shown in FIG. 3 with the exception that the step "Pressure reference for step 2" is not used and the flow rate reference is the desired total flow rate.

Figure 5:
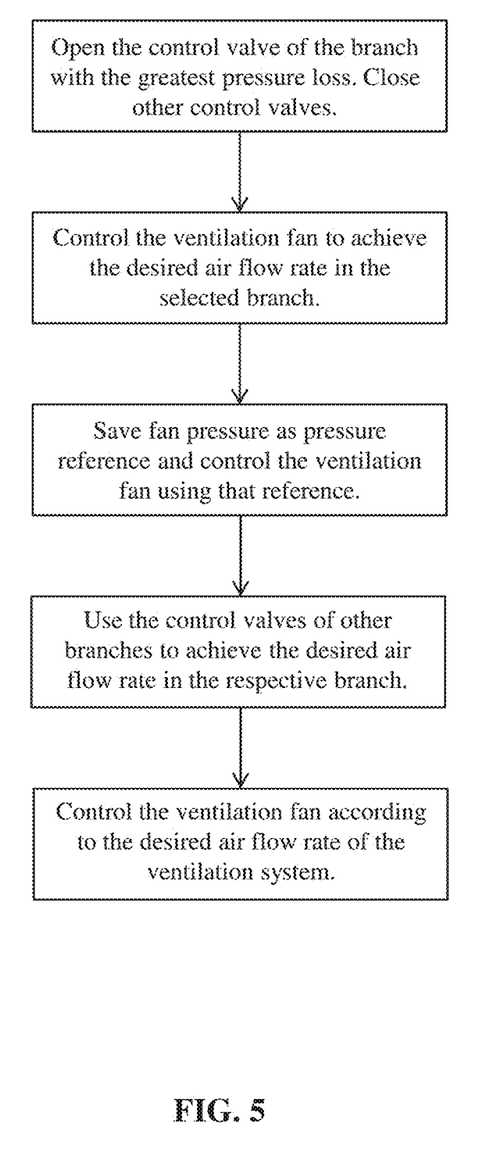
FIG. 5 shows a flow chart of the procedure for optimizing the energy consumption and initializing a ventilation system according to an exemplary embodiment of the present disclosure.

FIG. 5 shows a flow chart of the procedure for optimizing the energy consumption and initializing a ventilation system, according to an exemplary embodiment of the present disclosure.

In a ventilation system where two different branches have a common duct section, the flow resistance of the common duct section influences both branches. When the control valve in the first branch is first set to a desired point, the setting of the control valve in the second branch will affect the flow rate setting of the first branch. Thus, an iteration process is needed if any such branches are present in the ventilation system. The effect is the smaller of the flow resistance of the common duct is compared to the total flow resistance of the branch. Usually the common duct is such that its resistance can be neglected. The system is, however, at its energy optimum if the branch with the greatest flow resistance is not throttled.

In ventilation systems with frequency converter driven fans, the method according to the present disclosure does not require any additional measurements. There are known methods that can be used to estimate the fan output using only the frequency converter's estimates of the motor rotational speed and the torque in connection with the fan characteristic curves. The methods can be used to estimate the flow rate in step one. In the second step, the methods can be used to control the system with a constant pressure and to calculate the increased flow rate, if the control valves are set to the preferred settings one-by-one.

Figure 6:
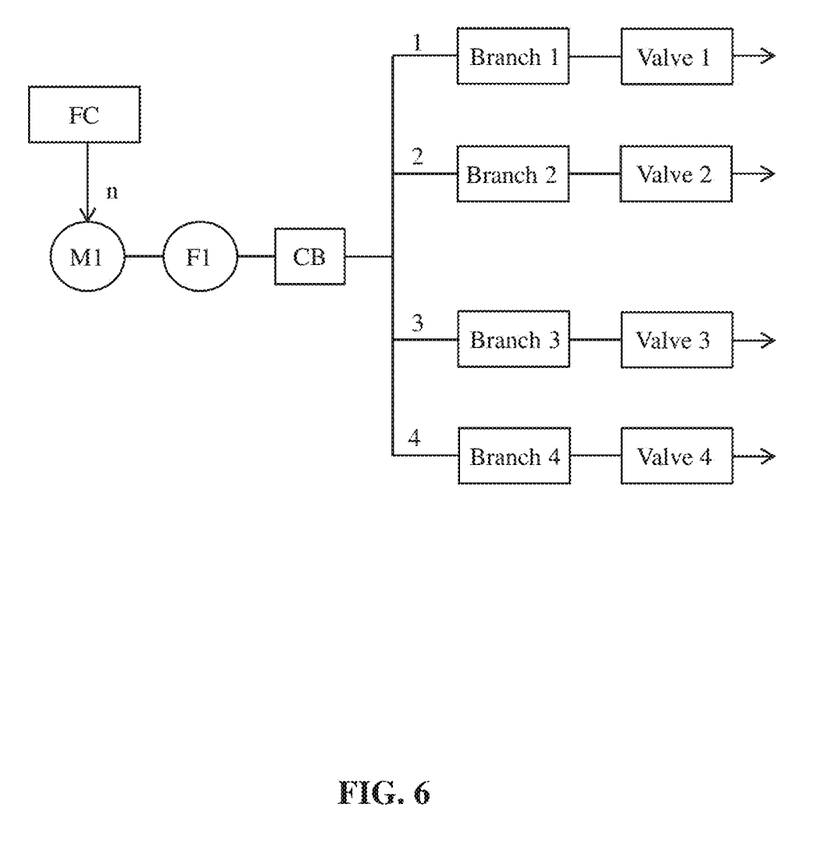
FIG. 6 shows a block diagram of a ventilation system that has been simulated according to an exemplary embodiment of the present disclosure.

A simulation of the procedure was conducted with a model with four branches according to FIG. 6. The fan F1 is driven by an electric motor M1, and the electric motor M1 is controlled by a frequency converter FC. The fan F1 supplies air to a common branch CB. The common branch CB is followed by four parallel branches 1, 2, 3, 4. Each branch 1, 2, 3, 4 includes a respective control valve 1, 2, 3, 4. The common branch CB is neglected from the simulation. Branch 1 was set to have the greatest pressure loss with the desired flow rate. The desired flow rates were 12, 10, 8 and 6 l/s for branches 1, 2, 3 and 4, respectively. In the simulations, the valve setting 50 corresponds to a closed valve. This means that the flow rates of the branches 1, 2, 3, 4 are zero at the beginning.

Figure 7:
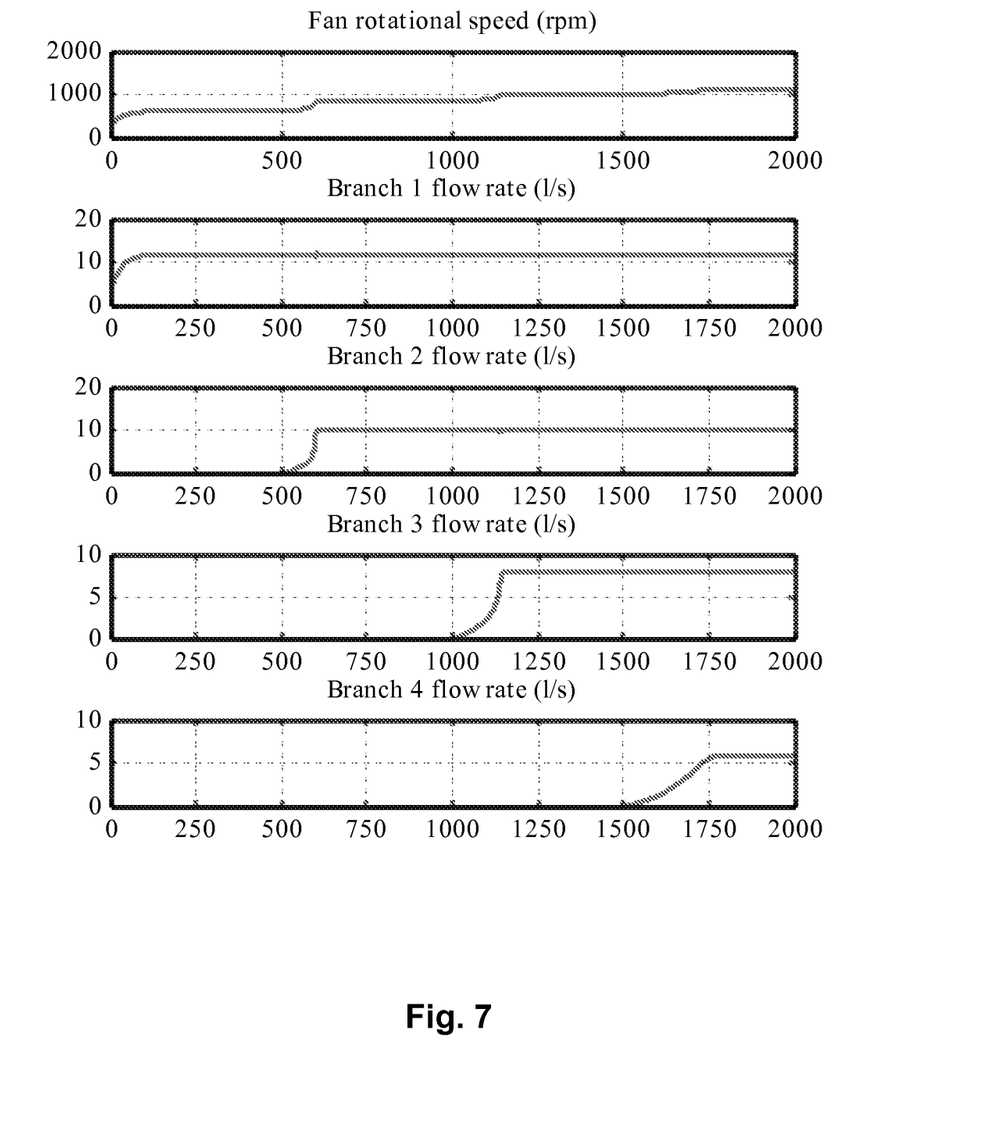
FIG. 7 shows the simulation procedure for the ventilation system shown in FIG. 6.

The steps in the simulation in FIG. 7 are as follows: In the first time slot 0 to 500 s, the flow rate in branch 1 is set by controlling the ventilation fan F1. In the second time slot 500 to 1000 s, the flow rate in branch 2 is set by controlling the respective valve 2. In the third time slot 1000 to 1500 s, the flow rate in branch 3 is set by controlling the respective valve 3. In the fourth time slot 1500 to 2000 s, the flow rate in branch 4 is set by controlling the respective valve 4. The reference pressure of the fan F1 is kept constant after the first time slot, for example, during the time interval 500 to 2000 s.

Figure 8:
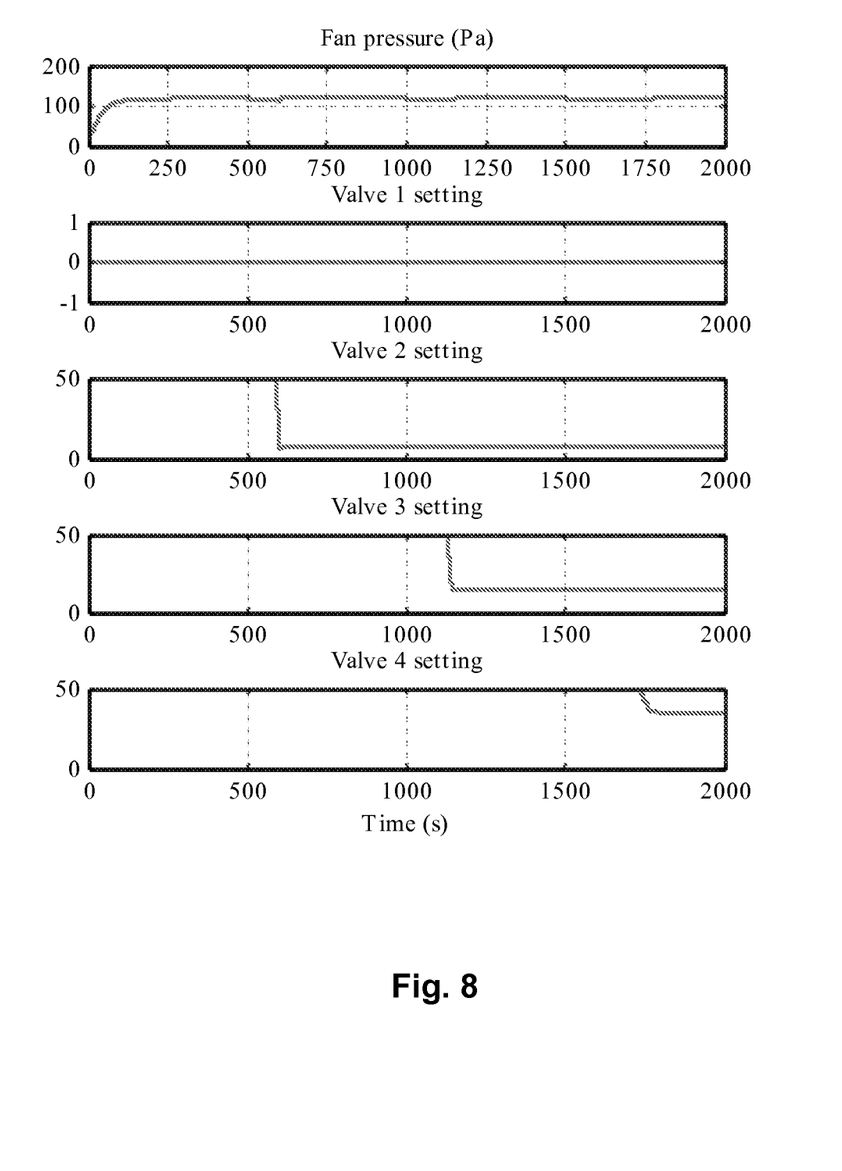
FIG. 8 shows the pressure and the control valve settings in the simulation procedure according to FIG. 7.

FIG. 8 shows that the flow rate of branch 1 stays constant after the first time slot 500 s since the ventilation fan is operated with a constant reference pressure even though the control valves of branches 2 to 4 are controlled as can be seen in the drawing. Valve setting 50 represents a situation in which the valve is closed and valve setting zero represents an open valve. When the control valve in branch 2 is set so that the flow rate through the branch is 10 l/s, the flow rate in branch 2 does not change when the control valves of branches 3 to 4 are controlled. This confirms the suggested procedure for the simulation.

The present disclosure and its exemplary embodiments are not limited to the examples described above but can vary within the scope of the claims.

Thus, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A method for tuning a ventilation system, the ventilation system including a ventilation fan supplying air to a plurality of branches, each branch including a corresponding control valve for regulating the air flow to that branch, the ventilation fan being driven by a frequency converter controlled electric motor, the method comprising:

selecting the branch in the ventilation system with the greatest pressure loss;

opening the control valve in the selected branch and closing the control valves in all other branches;

controlling the ventilation fan to produce a desired air flow rate into the selected branch by using fan characteristic shaft power to air flow rate curves and a shaft power estimate from the frequency converter, and by adjusting the rotational speed of the electric motor with the frequency converter so that the desired air flow rate is achieved;

calculating, in the frequency converter, simultaneously the fan pressure corresponding to the desired air flow rate from fan characteristic fan pressure to air flow rate curves based on the desired air flow rate and the rotational speed of the electric motor, and saving the calculated fan pressure in the frequency converter as a reference pressure; and adjusting the control valves in each of the remaining branches one-by-one so that the desired air flow rate to each branch is delivered while the fan is controlled by the frequency converter to produce constantly the reference pressure.

2. The method according to claim 1, comprising:

calculating a specific fan power of the ventilation system at a nominal operation point as a ratio of the electrical power consumed by the frequency converter and the total air flow rate calculated in the frequency converter.

3. The method according to claim 1, wherein the calculated fan pressure is stored in a memory of the frequency converter as the reference pressure.

4. A non-transitory computer-readable recording medium having recorded thereon a computer program that causes a processor of a frequency converter to execute operations for tuning a ventilation system, the ventilation system including a ventilation fan supplying air to a plurality of branches, each branch including a corresponding control valve for regulating the air flow to that branch, the ventilation fan being driven by an electric motor controlled by the frequency converter, the program causing the processor of the frequency converter to carry out operations comprising:

selecting the branch in the ventilation system with the greatest pressure loss;

opening the control valve in the selected branch and closing the control valves in all other branches;

controlling the ventilation fan to produce a desired air flow rate into the selected branch by using fan characteristic shaft power to air flow rate curves and a shaft power estimate from the frequency converter, and by adjusting the rotational speed of the electric motor with the frequency converter so that the desired air flow rate is achieved;

calculating simultaneously the fan pressure corresponding to the desired air flow rate from fan characteristic fan pressure to air flow rate curves based on the desired air flow rate and the rotational speed of the electric motor, and saving the calculated fan pressure in the frequency converter as a reference pressure; and adjusting the control valves in each of the remaining branches one-by-one so that the desired air flow rate to each branch is delivered while the fan is controlled by the frequency converter to produce constantly the reference pressure.

5. The non-transitory computer-readable recording medium according to claim 4, wherein the program causes the processor of the frequency converter to carry out an operation comprising calculating a specific fan power of the ventilation system at a nominal operation point as a ratio of the electrical power consumed by the frequency converter and the total air flow rate calculated in the frequency converter.

\* \* \* \* \*